US007919171B2

(12) United States Patent
Young

(10) Patent No.: US 7,919,171 B2

(45) Date of Patent: Apr. 5, 2011

(54) LIDDING FOR A CHILD-RESISTANT BLISTER PACKAGE

(75) Inventor: Patrick Henry Young, Colonial Heights, VA (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 893 days.

(21) Appl. No.: 11/784,977

(22) Filed: Apr. 9, 2007

(65) Prior Publication Data

US 2008/0245698 A1 Oct. 9, 2008

(51) Int. Cl.

| | |
|---|---|
| ***B32B 1/00*** | (2006.01) |
| ***B65D 1/09*** | (2006.01) |
| ***B65D 83/04*** | (2006.01) |
| ***B65D 85/42*** | (2006.01) |

(52) U.S. Cl. ......................... 428/178; 206/528; 206/538

(58) Field of Classification Search .................. 428/178; 206/528, 538, 531, 532

See application file for complete search history.

(56) References Cited

U.S. PATENT DOCUMENTS

| | | | | |
|---|---|---|---|---|
| 3,921,805 | A * | 11/1975 | Compere | 206/532 |
| 4,537,312 | A * | 8/1985 | Intini | 206/531 |
| 2001/0030140 | A1* | 10/2001 | Mundt | 206/534 |
| 2005/0130545 | A1 | 6/2005 | Bansal et al. | |
| 2005/0139505 | A1 | 6/2005 | Miller et al. | |
| 2006/0289328 | A1 | 12/2006 | Hession | |

FOREIGN PATENT DOCUMENTS

EP 162378 B1 8/1990

* cited by examiner

*Primary Examiner* — Jennifer C McNeil
*Assistant Examiner* — Catherine Simone

(57) ABSTRACT

A blister package is provided in which the lidding component includes a tear-resistant nonwoven layer and a barrier layer wherein the controlled delamination of the nonwoven layer increases the puncture resistance, thereby improving the child-resistant properties of the package.

9 Claims, 2 Drawing Sheets

LIDDING FOR A CHILD-RESISTANT BLISTER PACKAGE

BACKGROUND OF THE INVENTION

1. Field of the Invention

The present invention relates to improved child-resistant blister packaging.

2. Description of the Related Art

Blister packages are known in the art, for example as packaging for pharmaceuticals and other materials. Blister packages include a blister component having at least one cavity formed therein into which the medicine or other packaged material is placed prior to being sealed to a lidding or top web component. Blister components known in the art include soft-tempered aluminum foils, hard-tempered aluminum foils, multi-layer cold formable foils, and thermoformed films. Lidding components known in the art include films, and combinations of films, paper, and/or foil. The lidding component generally has a heat-seal layer applied to one side thereof which is used to heat seal the lidding component to the blister component during the manufacture of the blister package. When used for packaging pharmaceuticals and other materials that are oxygen- and/or moisture-sensitive, the blister package should have sufficient barrier properties to ensure a reasonable shelf-life for the packaged materials. When used for packaging pharmaceuticals or other materials that may be harmful to children, a blister package should also be child-resistant so that a child cannot open the package, bite through it, or otherwise damage the packaging in a way that exposes the packaged pharmaceutical or other packaged material. At the same time, it is generally desirable that an adult can open the blister package without undue effort.

Examples of blister packages known in the art include peel-open, tear-open, push-through, and peel off-push through packages. In a peel-open package, the lidding component is peeled away from the blister component to reveal the packaged material. In a tear-open package, the lidding and blister components contain a notch or perforation that extends from an edge of the package in the direction of the cavity. The notch can be made in an external edge of a package, or, for packages comprising multiple blisters separated by perforations, the notch is preferably contained internal to the package such that when an individual blister is separated at the perforations from the rest of the blisters in the package, the notch in the separated blister is on an exposed edge thereof. The package is then torn at the notch and the tear is propagated until the contents of the package are capable of being removed. In a push-through package, the packaged material is pushed through the lidding component by applying finger pressure to the exterior of the blister cavity. In a peel off-push through package, the lidding component is a multi-layer laminate that generally includes an outer paper layer bonded by an intermediate adhesive layer to a film layer (e.g. polyester film), with the film layer also being bonded by a peelable adhesive layer to a foil layer on the side of the film opposite that which is bonded to the paper layer. The foil layer generally has a heat-seal layer coated or otherwise applied to the side of the foil opposite the film which provides a non-peelable seal when heat-sealed to the blister component.

There remains a need for improved child-resistant blister packaging that protects materials packaged therein from moisture and/or oxygen that is also economical to manufacture and provides resistance to being opened by children, but with relative ease of opening for adults.

BRIEF SUMMARY OF THE INVENTION

Certain embodiments of the present invention is directed to a blister package comprising a blister component having an inner surface and an outer surface and a multi-layer lidding component having an inner surface and an outer surface, wherein selected portions of the inner surface of the blister component and inner surface of the lidding component are adhered together to form at least one cavity therebetween, the blister component comprising a first barrier layer and the lidding component comprising a second barrier layer and a backing layer that has a delamination strength less than the peel strength of the adhered inner surfaces of the blister component and lidding component.

DETAILED DESCRIPTION OF THE INVENTION

Figure 1:
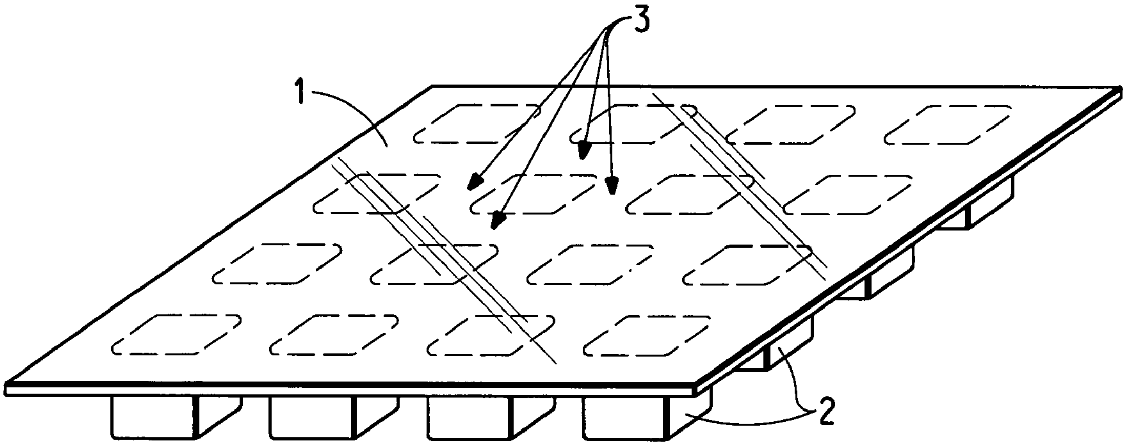
FIG. 1 is a schematic elevation view of a blister package.

The present invention relates to an improved child-resistant blister package that comprises a multi-layer lidding component and a blister component. The multi-layer lidding component includes at least one barrier layer and at least one backing layer. Examples of these types of blister packages are disclosed in U.S. Patent Application No. US2005/0139505 and incorporated herein by reference in its entirety.

The term "copolymer" as used herein includes random, block, alternating, and graft copolymers prepared by polymerizing two or more comonomers and thus includes dipolymers, terpolymers, etc.

The term "polyethylene" (PE) as used herein is intended to encompass not only homopolymers of ethylene, but also copolymers wherein at least 85% of the recurring units are ethylene units, and includes "linear low density polyethylenes" (LLDPE) which are linear ethylene/a-olefin copolymers having a density of less than about 0.955 g/cm$^3$, and "high density polyethylenes" (HDPE), which are polyethylene homopolymers having a density of at least about 0.94 g/cm$^3$.

The term "polyester" as used herein is intended to embrace polymers wherein at least 85% of the recurring units are condensation products of dicarboxylic acids and dihydroxy alcohols with linkages created by formation of ester units. Examples of polyesters include poly(ethylene terephthalate) (PET), which is a condensation product of ethylene glycol and terephthalic acid, poly(1,3-propylene terephthalate), which is a condensation product of 1,3-propanediol and terephthalic acid and poly(ethylene naphthalate).

The term "polyamide" as used herein is intended to embrace polymers containing recurring amide (—CONH—) groups. One class of polyamides is prepared by copolymerizing one or more dicarboxylic acids with one or more diamines. Examples of polyamides suitable for use in the present invention include poly(hexamethylene adipamide) (nylon 6,6) and polycaprolactam (nylon 6).

The term "barrier layer" as used herein refers to a sheet layer, including films and coatings that restrict the permeation of oxygen and/or water vapor into a blister package that comprises the sheet layer. Barrier layers suitable for use in the present invention preferably have a moisture vapor transmission rate (MVTR) of less than 6 g/m$^2$/24 hr measured according to ASTM F1249 under the conditions of 38° C. and 90%

Relative Humidity and/or an oxygen transmission rate of less than 28 $cm^3/m^2/24$ hr measured according to ASTM D3985 under the conditions of 23° C., 100% oxygen, and 100% Relative Humidity.

The terms "nonwoven fabric", "nonwoven sheet", "nonwoven layer", and "nonwoven web" are collectively referred to as "nonwoven material" and, as used herein, refer to a structure of individual fibers, filaments, or threads that are positioned in a random manner to form a planar material without an identifiable pattern, as opposed to a knitted or woven fabric. Examples of nonwoven fabrics include meltblown webs, spunbond webs, flash spun webs, carded webs, spunlaced webs, and composite sheets comprising more than one nonwoven web, such as SMS.

The term "spunbond fibers" as used herein means fibers that are melt-spun by extruding molten thermoplastic polymer material as fibers from a plurality of fine, usually circular, capillaries of a spinneret with the diameter of the extruded fibers then being rapidly reduced by drawing and then quenching the fibers.

The term "meltblown fibers" as used herein, means fibers that are melt-spun by meltblowing, which comprises extruding a melt-processable polymer through a plurality of capillaries as molten streams into a high velocity gas (e.g. air) stream.

The term "spunbond-meltblown-spunbond nonwoven fabric" ("SMS") as used herein refers to a multi-layer composite sheet comprising a web of meltblown fibers sandwiched between and bonded to two spunbond layers. Additional spunbond and/or meltblown layers can be incorporated in the composite sheet, for example spunbond-meltblown-meltblown-spunbond webs ("SMMS"), etc.

The term "multiple component fiber" as used herein refers to a fiber that is composed of at least two distinct polymeric components that have been spun together to form a single fiber. At least two polymeric components are arranged in distinct substantially constantly positioned zones across the cross-section of the multiple component fibers, the zones extending substantially continuously along the length of the fibers.

The term "bicomponent fiber" is used herein to refer to a multiple component fiber that is made from two distinct polymer components, such as sheath-core fibers that comprises a first polymeric component forming the sheath, and a second polymeric component forming the core; and side-by-side fibers, in which the first polymeric component forms at least one segment that is adjacent at least one segment formed of the second polymeric component, each segment being substantially continuous along the length of the fiber with both polymeric components being exposed on the fiber surface. Multiple component fibers are distinguished from fibers that are extruded from a single homogeneous or heterogeneous blend of polymeric materials.

The term "multiple component nonwoven web" as used herein refers to a nonwoven web comprising multiple component fibers. The term "bicomponent web" as used herein refers to a nonwoven web comprising bicomponent fibers. A multiple component web can comprise single component and/or polymer blend fibers in addition to multiple component fibers.

As used herein, the term "film" includes layers that are extruded directly onto one of the other layers in the lidding or blister components, as well as films that are formed in a separate film-forming step and then laminated to one or more other layers.

The term "full-surface bonded nonwoven fabric" as used herein refers to a nonwoven fabric that has been bonded by applying heat and pressure to the nonwoven fabric between two substantially smooth bonding surfaces. A full-surface bonded nonwoven fabric is bonded over substantially 100% of its outer surfaces by fiber-to-fiber bonds. The use of smooth bonding surfaces results in each side of the full-surface bonded nonwoven fabric being substantially uniformly bonded. Full surface bonded nonwoven fabrics are described in U.S. Patent Application No. US2005/0130545.

FIG. 1 illustrates a schematic elevation view of an embodiment of a blister package according to the present invention. Lidding component 1 is heat-sealed to a blister component comprising a plurality of cavities 2. The lidding and blister components are heat-sealed in the shoulder areas 3 that separate the individual cavities. The shoulder areas generally include perforations (not shown) between the individual blisters or groups of individual blisters The blister component is generally a transparent and flexible polymeric material having a plurality of individual blister and notch cavities formed therein. Typically, the blister cavity is of sufficient volume or size to contain a single, pre-measured dosage of a pharmaceutical composition therein, wherein the composition is typically a pill, tablet, capsule or the like. The blister component can be constructed of a polymeric material such as low density polyethylene or an olefinic copolymer selected from the group consisting of ethylene-vinyl acetate, ethylene-acrylic acid, ethylene-ethyl acrylate, and blends thereof, polyamides, polyvinylchloride, polypropylene, polyacetal, polybutylene terephthalate, polyethylene terephthalate, nylons and polyester. Various flouropolymers exhibiting transparency and flexibility can also be useful in fabricating the blister component.

The barrier layer of the blister component abuts the blister layer that retains the pharmaceutical dosage within the blister cavity. Generally, the barrier layer is a relatively thin sheet of a sterile, non-moisture absorbing material, suitable for rupturing with relatively little pressure applied thereto. Typically, the barrier layer can be constructed of a metallic foil material such as aluminum, polyester, papers or polyvinyl chloride. Aluminum foil is a preferred barrier layer material. Additionally, the barrier layer can comprise at least two layers, one of which provides the barrier effect and the other which is useful in moisture sensitive applications.

FIG. **2*a* is a cross-sectional view of an embodiment of a lidding component suitable for use in embodiments of the present invention. Backing layer 5 is bonded to barrier layer 7 by intervening adhesive tie layer 6. Heat-seal layer 8 is adhered to the barrier layer on the side of the barrier layer opposite the tie layer. A blister package is formed by heat-sealing the lidding component to the blister component with heat-seal layer 8 facing the blister component such that backing layer 5** forms one of the outer surfaces of the blister package.

The barrier layer of the lidding component can be a sheet layer selected from the group consisting of polymeric films, coated polymeric films, metalized polymeric films, and metal foils.

The peelable backing layer of the lidding component is generally constructed of a reinforceable sheet material not easily ruptured by forces exerted by the human fingers or teeth. The rupture-resistant properties of the backing layer particularly provides the blister package with the feature of child resistance. Typical materials of fabrication of the backing layer can be selected from the group consisting of woven, and non-woven materials, long metallic or polymeric fiber, reinforced polymers, and warp-knit construction materials. A particularly preferred backing layer material is any woven or non-woven material. Polymers suitable for forming the backing layer include polyesters such as poly(ethylene terephthalate) and poly(1,3-propylene terephthalate), polyamides such as nylon 6,6 and nylon 6, polyolefins such as polyethylene and polypropylene, and copolymers thereof.

The adhesive tie layer can be vinyl/acrylic compositions, blends of polyolefin resins comprising ethylene vinyl acetate copolymers, blends of polyolefin resins comprising ethylene methyl acrylate copolymers, ethylene vinyl acetate resins, ethylene methyl acrylate resins, and polyester-based polyurethanes. The adhesive tie layer is generally used at a dry coating weight between about 3 $g/m^2$ and 10 $g/m^2$, with a dry coating weight between about 4 $g/m^2$ and 8 $g/m^2$ generally being preferred. The tie layer is typically applied to the backing web, but alternately can be applied to the barrier layer. Irrespective of whether the tie layer is first applied to the backing layer or to the barrier layer the heat seal layer is applied to the surface of the barrier layer opposite the surface on which the tie layer is present.

The heat-seal layer comprises a heat-sealable sealant selected from the group consisting of poly(vinylidene chloride), vinyl/acrylic compositions, blends of polyolefin resins comprising ethylene vinyl acetate copolymers, blends of polyolefin resins comprising ethylene methyl acrylate copolymers, and polyester-based compositions. The heat seal layers are generally applied at a dry coating weight of about 4.8 to 5.6 $g/m^2$.

It has been found that one disadvantage of current "peel-push" through packages is that paper-film-foil laminates used in the lidding do not generally peel cleanly in one piece and often tear at the perforation, making it difficult to initiate a new peel. Some paper-film laminates and paper-film-foil laminates also have poor puncture resistance and can be chewed through by a child. Another disadvantage of using paper-film laminates or paper-film-foil laminates in the lidding component is that it is not unusual to have problems with moisture being sealed in the blister when moisture that is retained in the paper forms steam at the high temperatures used in the heat-sealing process. Furthermore, once the plastic or paper-film barrier layer is removed, it is very easy for a child to access the drug through the remaining barrier layer of foil. One solution is to add a peelable backing layer to the barrier layer that is composed of a material with sufficient tear strength and puncture resistance, and also delaminates under the opening peel forces of a blister pack. e.g., a nonwoven sheet structure adhered to the outside surface of the foil in what is sometimes called "peel-push" backing. Perforations may be provided in the added layer to facilitate its removal and one or more corner or edge portions thereof may be left unadhered to the underlying foil, but in such a manner that would not be obvious to children. When the backing layer is peeled, it delaminates and a thin layer of it remains with the barrier layer (typically foil) to provide extra child resistance to the package.

This is achieved by the phenomenon of delamination, which is determined by parameters such as the relative strength of the backing layer, nonpeelable adhesive tie layer, the foil barrier layer, and the heat sealable layer and the strength of the interfaces between the layers. If the backing layer fracture strength is stronger than the nonpeelable adhesive tie layer, for example, adhesion failure will occur in the nonpeelable adhesive tie layer before delamination occurs in the backing layer. However, if the backing layer strength is weaker, then delamination of the backing layer will occur before any distortion or tearing. It is thus desirable to design the backing layer and select the nonpeelable adhesive tie layer to provide a controlled delamination of the backing layer to prevent distortion or damage thereto. Thus, the strength of the nonpeelable adhesive tie layer bond must exceed the fracture strength of the backing layer, thereby enabling a controlled delamination without tearing to occur. Also, the nonpeelable adhesive tie layer bond to the barrier layer and the heat sealable bond to the barrier layer/blister layer must be of sufficient strength to exceed the fracture strength of the backing layer. Nonwovens have been found to be especially suitable for this type of controlled delamination because of the skin-core type of structure that they typically exhibit. Additionally, nonwoven composites such as SMS can be used.

Controlled delamination may be achieved by several different methods. Varying coat weight, composition, crosslink density, etc. of either or both the nonpeelable adhesive tie layer and heat sealable layer can all be used to achieve the desired controlled delamination effect. Fracture strength of the skin-core interface of a nonwoven can also be varied by adjusting the spinning or calendering conditions. However, it should be noted the thermal characteristics of the nonwoven are of sufficient importance that significant modifications of the spinning and/or calendering conditions could compromise the desired product.

In one embodiment, the controlled delamination provided by a backing layer in the lidding component of the packages provides a peel-push through package wherein a thin layer of the backing layer remains attached to the barrier layer without tearing the package, whereas packages known in the art that utilize paper-film-foil laminates often do not provide tear-free packages. The controlled delamination also reduces the number of processing steps required to manufacture the lidding compared to the prior art by replacing three layers (paper-adhesive-film) with a single backing layer.

Figure 2A:
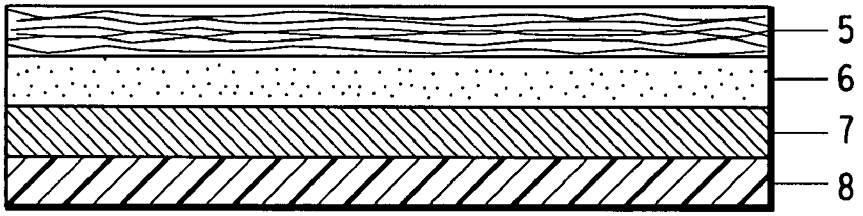
FIG. 2*a* is a schematic cross-sectional view of a lidding material useful in blister packages of the present invention.
Figure 2B:
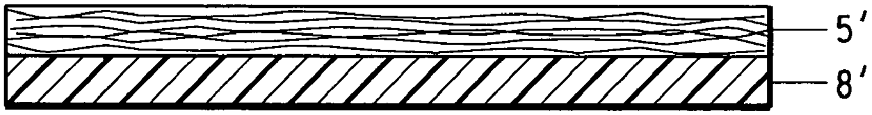
FIG. 2*b* is a schematic cross-sectional view of a second embodiment of a lidding material useful in blister packages of the present invention.

FIG. 2*b* is a cross-sectional view of a lidding component suitable for use as a different embodiment of a blister package. The lidding component includes backing layer 5' and heat-seal layer 8'. In this embodiment, the heat-seal layer is selected such that it is a barrier layer as well as being heat-sealable, thus eliminating the need for separate barrier and heat-seal layers. The backing layer preferably comprises at least one nonwoven sheet; however, any sheet that can exhibit the desired controlled delamination would be suitable. When the heat-sealable barrier layer is applied as a coating on the backing layer, it completely coats the backing layer to provide the desired barrier properties in the blister package. For example, poly(vinylidene chloride) coated on the backing layer at a basis weight ranging from about 5 $g/m^2$ to 120 $g/m^2$ can provide sufficient barrier properties as well as functioning as a heat-seal layer. The heat seal layer can also comprise vinyl/acrylic compositions, blends of polyolefin resins comprising ethylene vinyl acetate copolymers, blends of polyolefin resins comprising ethylene methyl acrylate copolymers, and polyester-based compositions.

Figure 3:
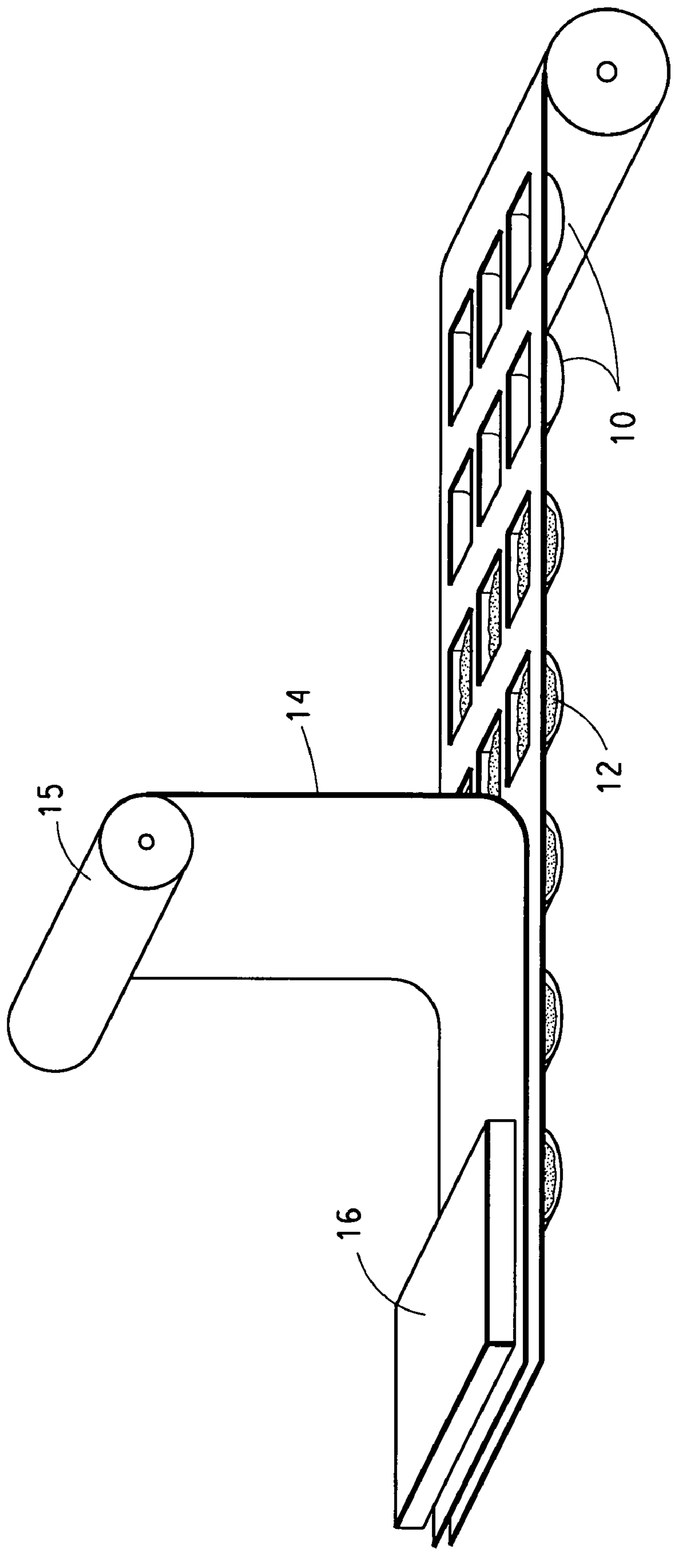
FIG. 3 is a schematic diagram of a process suitable for preparing a blister package of the present invention.

The blister package of the present invention can be manufactured using methods known in the art. FIG. 3 illustrates a process that is suitable for forming a blister package of the present invention. The blister cavities 10 are generally thermoformed into a forming web in-line just prior to filling the cavities with the material 12 to be packaged. The lidding component 14 is unwound from roll 15 and brought into contact with the formed and filled blister component such that the heat-seal layer of the lidding component contacts the blister component. The lidding and blister components are heat sealed, typically using a heated platen 16 with or without a pattern. Generally, some areas are not sealed to provide a starting point for peeling off the lidding or selected layers of the lidding prior to removing the product. If the lidding component is not pre-printed, printing is generally done just before heat sealing (not shown). After heat-sealing, the individual blisters are generally perforated using methods known in the art (not shown) so that they can be removed at point of use. The notches are preferably contained internal to the package such that they are not exposed until the individual blister is removed at point of use. The notch can also be formed on one of the external edges of the blister package, however forming the notches internal to the package decreases the likelihood that a child will be able to tear open the package.

Test Methods

The following test methods are employed to determine various reported characteristics and properties. ASTM refers to the American Society for Testing and Materials.

Basis Weight is a measure of the mass per unit area of a fabric or sheet and is determined by ASTM D-3776, which is hereby incorporated by reference, and is reported in $g/m^2$.

Spencer Puncture is a measure of the ability of a substrate to resist puncture by impact. Spencer puncture is measured for nonwoven fabrics and nonwoven/foil laminates using a hemispherical probe and is determined by ASTM F1342 (modified for 2 mm diameter probe) with a load cell capacity of 2.0 Joules, which is hereby incorporated by reference. It is reported in Newtons.

Peel Strength is the force required to separate a one inch wide heat seal. Seal strength is a measure of the ability of a package seal to resist separation. Seal strength data can be useful for setting sealing parameters. One-inch wide test specimens are cut from a sealed package and placed in a tensile test machine using ASTM F88. The specimen is pulled in tension and the force required to separate the specimen is recorded.

Example 1

This example demonstrates preparation of a blister package comprising a lidding component according to FIG. 2*a*, wherein the backing layer was a smooth-calendared full-surface bonded spunbond nonwoven web and the barrier layer in the lidding was a metal foil.

A spunbond bicomponent nonwoven web was prepared in which the fibers were continuous sheath/core fibers having a co-polyester sheath component composed of 17 mole percent modified di-methyl isophthalate PET copolymer and a poly (ethylene terephthalate) (PET) core component. A low melt 17% modified di-methyl isophthalate co-polyester with an intrinsic viscosity of 0.61 dl/g produced by E.I. du Pont de Nemours and Co, Wilmington. DE (DuPont) as Crystar co-polyester (Merge 4442) was used in the sheath and poly (ethylene terephthalate) polyester with an intrinsic viscosity of 0.53 dl/g, also available from DuPont as Crystar polyester (Merge 3949) was used in the core. The sheath comprised about 30% of the fiber cross sections and the core comprised about 70% of the fiber cross sections. The total polymer throughput per spin pack capillary was 0.8 g/min. The filaments were cooled in a 15 inch (38.1 cm) long quenching zone with quenching air provided from two opposing quench boxes at a temperature of 12° C. and a velocity of 1 m/sec. The filaments passed into a pneumatic draw jet spaced 50 inches (127 cm) below the capillary openings of the spin pack. Samples were collected while the pneumatic draw jet supply air pressure was 33 psi.

The web was thermally bonded between two polished chrome rolls. The web was bonded at a temperature of 170° C., a nip pressure of 500 psi, and a line speed of 75 ft/min. The bonded sheet was collected on a roll.

The thermally calendered bicomponent spunbond web was then laminated to a 0.93 mil (0.024 mm) thick soft-tempered aluminum foil obtained from Alcoa (Pittsburgh, Pa.) using Adcote 503 A/Cat F solvent-based poly(ethylene terephthalate)-based poly urethane permanent adhesive tie layer [obtained from Rohm & Haas (Philadelphia, Pa.). An Inta-Roto dry-bond coater/laminator (Model "The Delaware") was used to perform the lamination. The Adcote 503A/Cat F was mixed at a ratio of 62 percent by weight 503A, 3.5 percent by weight CatF, and 34.5 percent by weight of methyl ethyl ketone solvent. The bicomponent spunbond web was unwound from a primary unwind and the adhesive was applied to the bicomponent spunbond web using a reverse rotating gravure roll. The machine speed was 65 ft/min (19.8 m/min). The adhesive was applied at a dry coating weight of about 8 $g/m^2$. A hot air impingement dryer was used to dry the coated spunbond web to remove the solvent present in the tie layer adhesive. Air heated to a temperature of 74° C. was forced through a slotted nozzle assembly onto the adhesive-coated surface of the spunbond web evaporate the solvent.

After drying, the adhesive-coated spunbond nonwoven web layer was laminated to the foil layer which was unwound from a roll and contacted with the adhesive-coated side of the spunbond web in a nip formed by two cylindrical calender rolls. One of the rolls was a rubber-covered roll and the second roll was a steel roll heated to 82° C. by internal water heating. The nonwoven web contacted the heated steel roll in the nip and the aluminum foil contacted the rubber-surfaced roll. The laminated substrate was then rewound on a rewinder.

A solvent-based heat seal layer was then applied to the aluminum foil side of the above-described spunbond nonwoven/aluminum foil laminate using the reverse gravure coating process described above. The heat seal composition used was a vinyl/acrylic solvent-based sealant (JVHS-157-LT1, supplied by Watson-Rhenania, Pittsburgh, Pa.). The heat-seal coating was applied at 5.2 $g/m^2$ to the nonwoven/foil laminate. After applying the sealant, the coated material was dried using the same hot air impingement dryer described above and an air temperature of 275° F. (135° C.) to remove the ethyl acetate solvent. After drying the laminate was rewound on a rewinder.

The laminate lidding component was then sealed to polyvinyl chloride (PVC) using a commercially available bar sealer with seal temperature set to 392 F. (200 C.) with a pressure of 50 psi for a 1.0-second dwell time. Peel strength measurements were done with the laminate lidding component sealed to PVC. The force required to pull the sealed film apart was recorded by the Instron data acquisition system and displayed below in Table I. The laminate lidding component consistently delaminated leaving a thin layer of the nonwoven backing layer on the barrier layer.

Blister packages were prepared according to the process shown in FIG. 3 using an Uhlmann 1070 form-fill-seal blister packaging machine. The forming web used to form the blister component was 10 mil (0.254 mm) Pentapharm M570/01 poly(vinyl chloride) film supplied by Klockner Pentaplast of America (Gordonsville, Va.). The platen used to heat seal the lidding to the blister component was heated to a temperature of 200° C. and the blister component was notched to obtain a peel-push package design. Numerous blister packages of the present embodiment of the invention were produced on the machine with controlled delamination of the nonwoven and Spencer puncture measurements were made.

Comparative Example A

Comparative Example A was prepared similarly to Example 1 except that changes were made in the heat sealable layer coating. The lidding component was coated to achieve a heat sealable layer coat weight of 3.0 g/m$^2$ instead of 5.2 g/m$^2$. The laminate lidding component was then sealed to PVC using a commercially available bar sealer with seal temperature set to 392 F. (200 C.) with a pressure of 50 psi for a 1.0-second dwell time. Peel strength measurements were done with the laminate lidding component sealed to PVC. The force required to pull the sealed film apart was recorded by the Instron data acquisition system and displayed below in Table I. The laminate lidding component consistently peeled at the foil/PVC interface with no delamination of the nonwoven.

Numerous blister packages were produced similarly to Example 1 with low seal strengths of the foil to the PVC bottom web. The lack of delamination was the result of the seal strength of the heat sealable layer being lower than the delamination strength of the nonwoven. Spencer puncture measurements were made on the foil barrier layers. This data is shown in Table I.

Comparative Example B

Comparative Example B was prepared similarly to Example 1 except that changes were made in the adhesive tie layer coating weight. The lidding component was coated to achieve an adhesive tie layer coat weight of 4 g/m$^2$ instead of 8 g/m$^2$. Physical properties of the laminate lidding component are shown in Table I. The laminate lidding component was then sealed to PVC using a commercially available bar sealer with seal temperature set to 392 F. (200 C.) with a pressure of 50 psi for a 1.0-second dwell time. Peel strength measurements were done with the laminate lidding component sealed to PVC. The force required to pull the sealed film apart was recorded by the Instron data acquisition system and displayed below in Table I. The laminate lidding component consistently failed at the adhesive tie layer interface with no delamination of the nonwoven. Numerous blister packages were produced similarly to Example 1 with low seal strengths of the adhesive tie layer to the backing layer. The lack of controlled delamination is the result of the seal strength of the adhesive tie layer being lower than the delamination strength of the nonwoven.

Numerous blister packages were produced similarly to Example 1 with low seal strengths of the adhesive tie layer to the nonwoven layer. The lack of delamination is the result of the seal strength of the adhesive tie layer being lower than the delamination strength of the nonwoven. Spencer puncture measurements were made on the foil barrier layers. This data is shown in Table I.

Comparative Example C

Comparative Example B was prepared similarly to Example 1 except that changes were made in the adhesive tie layer mixing ratio. The lidding component was coated to achieve an adhesive tie layer coat weight of 8 g/m2. The Adcote 503A/Cat F was mixed in a ratio of 63.75 percent by weight of 503A with 1.75 percent by weight of Cat F. Physical properties of the laminate lidding component are shown in Table I. The laminate lidding component was then sealed to PVC using a commercially available bar sealer with seal temperature set to 392 F. (200 C.) with a pressure of 50 psi for a 1.0-second dwell time. Peel strength measurements were done with the laminate lidding component sealed to PVC. The force required to pull the sealed film apart was recorded by the Instron data acquisition system and displayed below in Table I. The laminate lidding component consistently failed at the adhesive tie layer interface with no delamination of the nonwoven. Numerous blister packages were produced similarly to Example 1 with low seal strengths of the adhesive tie layer to the backing layer. The lack of controlled delamination is the result of the seal strength of the adhesive tie layer being lower than the delamination strength of the nonwoven.

Numerous blister packages were produced similarly to Example 1 with low seal strengths of the adhesive tie layer to the nonwoven layer. The lack of delamination is the result of the seal strength of the adhesive tie layer being lower than the delamination strength of the nonwoven. Spencer puncture measurements were made on the foil barrier layers. This data is shown in Table I.

TABLE I

| | Example 1 | Comparative Example A | Comparative Example B | Comparative Example C |
|---|---|---|---|---|
| Basis Weight (g/m$^2$) | 163.8 | 165.5 | 162.5 | 169.2 |
| Tie layer peel strength (lbs/in) | 2.16 | 2.16 | 0.68 | 0.44 |
| Heat Seal peel strength (lbs/in) | 2.6 | 0.6 | 2.5 | 2.2 |
| Spencer Puncture (N) | 14.15 | 4.38 | 3.94 | 3.88 |

Example 1 which demonstrated a controlled delamination showed a 4× increase in puncture resistance over the comparative samples.

What is claimed is:

1. A blister package comprising a blister component having an inner surface and an outer surface and a multi-layer lidding component having an inner surface and an outer surface, wherein selected portions of the inner surface of the blister component and inner surface of the lidding component are adhered together to form at least one cavity therebetween, the blister component comprises a first barrier layer, the lidding component comprises a second barrier layer and a backing layer that has a delamination strength less than the peel strength of the adhered inner surfaces of the blister component and lidding component, and the backing layer comprises a fabric material selected from the group consisting of woven material, long metallic fiber material, polymeric fiber material, reinforced polymer material, and warp-knit construction material wherein the fabric material is selected from the group consisting of polyesters, polyamides, polyolefins, and copolymers thereof.

2. A blister package according to claim 1 wherein the fabric material is the woven material.

3. A blister package according to claim 2 wherein the fabric material is the polyamide.

4. A blister package according to claim 2 wherein the fabric material is the polyolefin.

5. A blister package according to claim 1 wherein the fabric material is the long metallic fiber material.

6. A blister package according to claim 1 wherein the fabric material is the polymeric fiber material.

7. A blister package according to claim 1 wherein the fabric material is the reinforced polymer material.

8. A blister package according to claim 1 wherein the fabric material is the warp-knit construction material.

9. A blister package according to claim 1 wherein the fabric material is the polyester.

* * * * *